(12) United States Patent
van den Brink et al.

(10) Patent No.: US 7,543,949 B2
(45) Date of Patent: Jun. 9, 2009

(54) HINGE ACTUATOR FOR A WING MIRROR UNIT

(75) Inventors: Albertus van den Brink, Barneveld (NL); Milan Duchenne, Rotterdam (NL); Peter Alexander Hamming, Steenwijk (NL)

(73) Assignee: MCi (Mirros Controls International) Netherlands B.V., Montfoort (NL)

( * ) Notice: Subject to any disclaimer, the term of this patent is extended or adjusted under 35 U.S.C. 154(b) by 449 days.

(21) Appl. No.: 11/551,737

(22) Filed: Oct. 23, 2006

(65) Prior Publication Data

US 2007/0084707 A1    Apr. 19, 2007

Related U.S. Application Data

(63) Continuation of application No. PCT/NL2005/000285, filed on Apr. 19, 2005.

(51) Int. Cl.
*G02B 7/182* (2006.01)
*G02B 7/18* (2006.01)
*A47G 1/24* (2006.01)
*B60R 1/02* (2006.01)

(52) U.S. Cl. .................. 359/877; 359/841; 248/479

(58) Field of Classification Search .............. 359/841, 359/877, 872; 248/479, 480, 484
See application file for complete search history.

(56) References Cited

U.S. PATENT DOCUMENTS

| 6,022,113 | A  | * | 2/2000  | Stolpe et al. ............... 359/841 |
| 6,322,221 | B1 | * | 11/2001 | van de Loo ................. 359/841 |
| 6,390,630 | B1 | * | 5/2002  | Ochs ......................... 359/841 |
| 7,070,287 | B2 |   | 7/2006  | Foote et al.              |

FOREIGN PATENT DOCUMENTS

EP          1238858 A2    11/2002

* cited by examiner

*Primary Examiner*—Alessandro Amari
(74) *Attorney, Agent, or Firm*—Dykema Gossett PLLC

(57) ABSTRACT

A hinge actuator comprising a first part which is pivotably connected with a second part, and an electric drive for pivoting the parts relative to each other. The first and the second parts include stops that cooperate in a first pivoting direction for defining a position of the actuator parts. A coupling is provided between the first and the second part, so that in a first position the first part and the second part are connected via the drive and, driven by the drive, can be pivoted relative to each other, and a second position in which the first part and the second part are not connected via the drive and can be pivoted relative to each other manually.

20 Claims, 4 Drawing Sheets

HINGE ACTUATOR FOR A WING MIRROR UNIT

CROSS-REFERENCE TO RELATED APPLICATION

This application is a continuation of and claims the benefit of PCT Application No. PCT/NL2005/000285, filed on Apr. 19, 2005, which claims benefit of The Netherlands Application No. 1026002, filed Apr. 22, 2004, which applications are fully incorporated herein by reference.

TECHNICAL FIELD

The invention relates to a hinge actuator that may be used in connection with a wing mirror unit of a vehicle.

BACKGROUND

Hinge actuators are known and is used, for instance, as a hinge actuator for a wing mirror unit of a motor vehicle. The first part of the actuator is then typically connected with the door of a motor vehicle. The first part then often comprises a base plate to be mounted on the door, which base plate is provided with a basic shaft. The second part then comprises a mirror support, which is typically arranged pivotably about the basic shaft. The mirror support, also referred to as mirror supporting frame, typically comprises a mirror housing in which a mirror glass is accommodated.

The mirror support, in particular the mirror housing, can then pivot relative to the base plate between a folded-in position, in which the width of the vehicle, for instance for the purpose parking, is reduced, and a folded-out position for use of the wing mirror unit under normal operating conditions. In the folded-in position, the mirror support extends in substantially rearward orientation along the longitudinal axis of the bodywork of the vehicle. In the folded-out position, the mirror support extends substantially transversely to the longitudinal axis of the bodywork.

The folded-out position is then defined in that the stops cooperate upon outward pivoting in the first pivoting direction from the folded-in position to the folded-out position, so that further pivoting is hampered. Upon an overload in the outward pivoting direction, typically, the cooperating stops can be overcome, so that the mirror support can pivot beyond the folded-out position to an overfold position.

The mirror support can be pivoted both electrically and non-electrically, for instance manually, relative to the base plate. By the use of the coupling between the first and the second part, the electric drive can be uncoupled, so that a pivoting movement of the mirror support not caused by the drive, for instance an inward pivoting movement resulting from impact forces or a manual inward pivoting movement, does not force any movements of the drives. Thus, damage to the electric drive, such as fracture in the drive train or defects in an electric motor, can be avoided.

It is desired that the select or predetermined position of the actuator parts relative to each other be well-defined. In the use of the hinge actuator in a wing mirror unit, in this way for instance the folded-out position of the mirror support can then be defined so well that unintentional pivoting to the overfold position is prevented. In practice, the folded-out position in the first pivoting direction, i.e. in an outward pivoting direction towards the overfold position, is typically defined in that the stops are under spring action and cooperate with high friction. The definition of the select or predetermined position in the second, opposing or opposite direction, i.e. in an inward or backward pivoting direction from the folded-out position towards the folded-in position, is typically defined in that the drive is made of self-braking design.

It has been found desirable, however, that the mirror housing upon manual adjustment be secured in the folded-out position in such a way that a clearly sensible coupling or "click" can be felt. For instance, the force that is needed to pivot the mirror support from the folded-out position to the folded-in position is of the same order of magnitude as the required force for pivoting from the folded-out position to the overfold position. By providing a pair of auxiliary stops which, from the select or predetermined position, cooperate in the second pivoting direction, i.e., in the case of a wing mirror unit, from the folded-out position in the inward pivoting direction, this problem can be solved.

However, the force required for overcoming both the stops and the extra stops would have to be of the same order of magnitude. However, the electric drive then cannot adjust the mirror housing from the folded-out position to the folded-in position, unless unacceptably powerful and costly electric motors are used, or the force required for overcoming the extra stops is so slight that upon manual inward pivoting from the folded-out position no resistance of significance is sensed. Also, as a consequence of this, the measure of arranging, by means of a simple current limiting circuit, for the electric motor to be switched off when the folded-out position is reached cannot be used without problems anymore.

SUMMARY

An object of the invention is to provide a hinge actuator for use in a wing mirror, with which a select or predetermined position upon manual adjustment is well-defined while a relatively light drive can suffice. To that end, a hinge actuator according to an embodiment of the invention is characterized in that the first and the second hinge part are furthermore provided with auxiliary stops for defining the select or predetermined position in a second, opposing or opposite pivoting direction, the auxiliary stops being adjustable relative to each other by means of the drive from a first position in which they block driven pivoting movement of the parts in the second direction, to a second position in which they clear driven pivoting movement in the second direction. What thus may be achieved is that the auxiliary stops upon manual adjustment hamper backward pivoting, while the auxiliary stops upon electric adjustment may be removed under the action of the drive.

Advantageously, at least one of the auxiliary stops may be slidably or pivotably arranged on the hinge part. As a result, adjustment of the auxiliary stops relative to each other can be realized in a simple manner.

The drive may be provided with a drive element which carries an operating cam for adjusting at least one of the cooperating auxiliary stops from the first position into the second position or vice versa. As a result, the adjustment of the auxiliary stops can be realized in a reliable manner.

Elegantly, at least one of the auxiliary stops may be under spring action to return from the second position to the first position or vice versa. As a result, the construction of the actuator can be further simplified.

Alternatively, the drive may be provided with a guide track for constrained guiding of at least one of the auxiliary stops between the first and second position. As a result, the construction of the actuator can be further simplified in that one or more springs can be dispensed with.

Elegantly, the actuator may be arranged, upon driven pivoting movement from the select or predetermined position in the second direction, first to adjust the auxiliary stops from the first position to the second position. What can thereby be achieved is that the power of the electric motor can be chosen to be relatively low. Moreover, the drive element which carries the operating cam may be included in the train of the drive with free travel.

Further advantageous embodiments of the invention are set forth in the subclaims.

The invention will be further elucidated on the basis of an exemplary embodiment which is represented in a drawing.

BRIEF DESCRIPTION OF THE DRAWINGS

The figures concern only a preferred embodiment of the invention which is given by way of non-limiting exemplary embodiment. In the figures, the same or corresponding parts are indicated with the same reference numerals.

DETAILED DESCRIPTION

Figure 1:
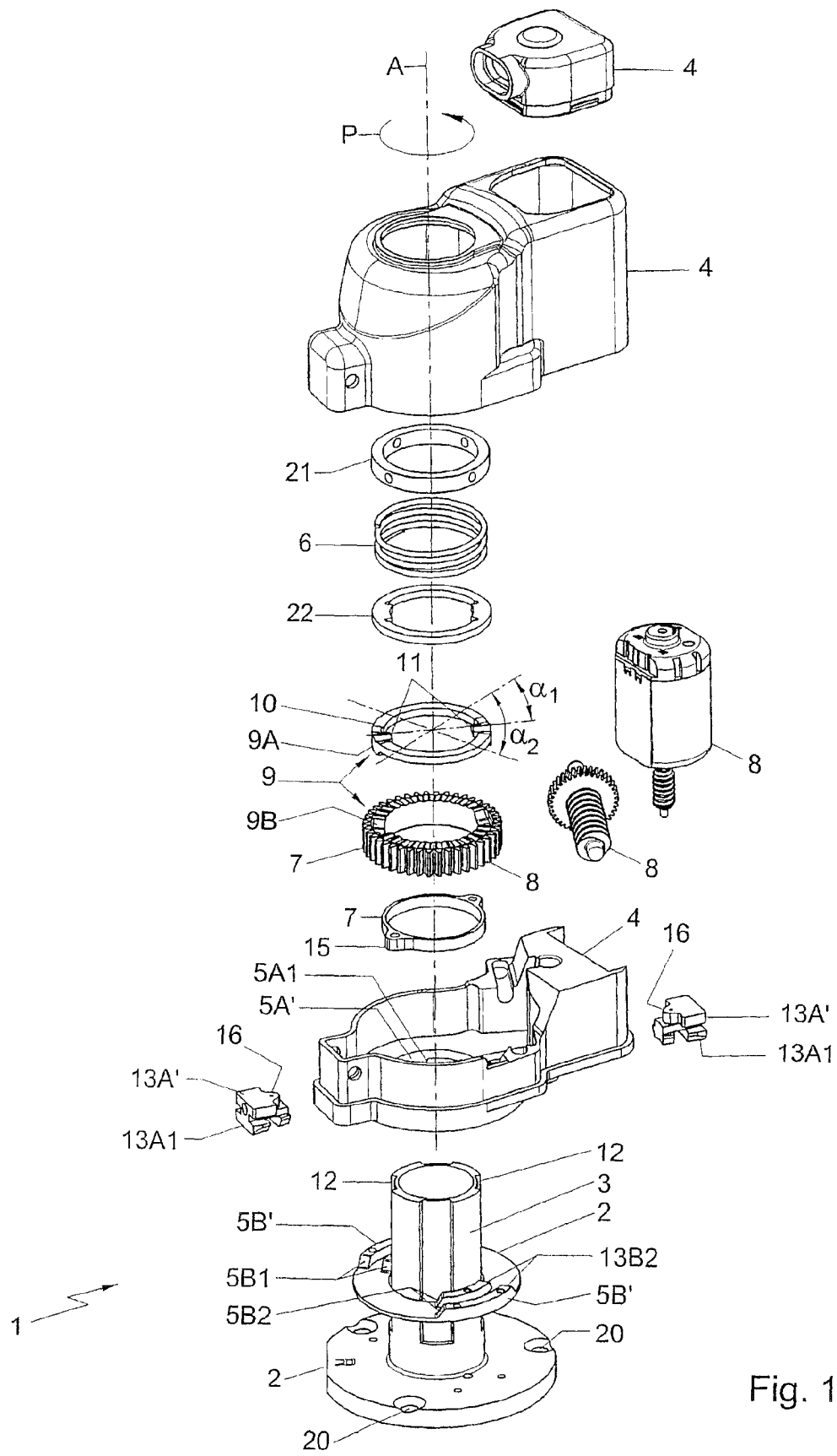
FIG. 1 is a schematic perspective view of a hinge actuator in disassembled condition, viewed from above.

The figures show a hinge actuator 1 for a wing mirror unit. The hinge actuator 1 comprises a base plate 2 for mounting on a motor vehicle, for instance by mounting the base plate 2 via screw holes 20 onto the door of a motor vehicle. The base plate 2 is provided with a basic shaft 3 whose orientation during use is substantially upstanding. A mirror support 4 is arranged pivotably about the basic shaft 3, so that the geometric longitudinal axis A of the basic shaft 3 forms the rotation axis. In this exemplary embodiment, the hinge actuator is designed as a line hinge. The base plate 2 with basic shaft 3 then forms a first part of the hinge actuator. The first part is hingedly connected with the second part, formed by the mirror support 4 arranged about the basic shaft.

Figure 4:
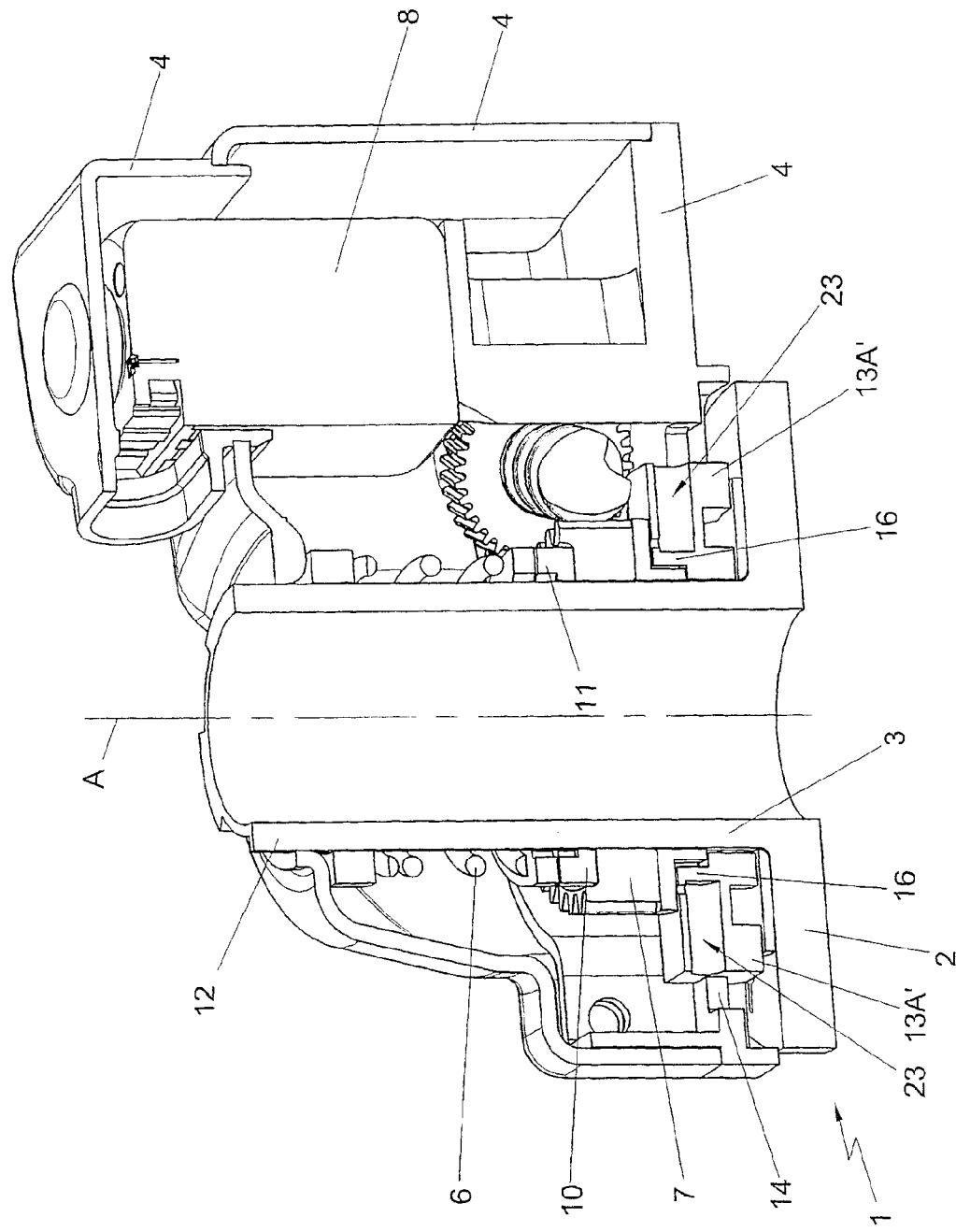
FIG. 4 is a schematic cross section of the actuator of FIG. 1 in assembled condition.

The mirror support 4 is usually coupled with a mirror cap, not represented in FIG. 4, which likewise surrounds the mirror supporting plate coupled with the mirror support, on which a mirror glass is mounted. Between the support 4 and the mirror supporting plate, usually a mirror adjustment mechanism is arranged by which the mirror glass can be pivoted relative to the mirror support about a substantially upstanding and/or horizontal pivoting axis.

It is noted that in FIG. 1 the base plate 2 and the mirror support 4 for practical reasons are represented as being built up from loose parts. It will be clear that the loose parts of both the base plate 2 and the mirror support 4 may also be composed of one part, or from still more parts.

The base plate 2 and the mirror support 4 are provided with cooperating stops 5a, 5b for defining a folded-out position S of the mirror support relative to the base plate 2. This position is shown in FIG. 1.

During use, the mirror support 4 in the folded-out position S usually extends substantially transversely to the longitudinal axis of the motor vehicle. The cooperating stops 5a, 5b in this exemplary embodiment are designed as slanting sides of two downwardly extending cams 5a' on the mirror support 4 which in the folded-out position S abut against corresponding slanting faces 5b1, 5b2 of two upwardly extending cams 5b' on the base plate 2. The cooperating stops 5a1, 5b1 on the one hand and 5a2, 5b2 on the other hand define, through cooperation, a select or predetermined position, i.e. the folded-out position S, in a first direction indicated with an arrow P, i.e. the outward folding direction.

From the folded-out position S, the mirror support, as will be further elucidated hereinafter, can pivot inwardly in a second, opposing or opposite pivoting direction to a folded-in position in which the mirror is lodged in substantially rearward orientation along the bodywork of the motor vehicle. Further, it is possible to pivot the mirror support 4 from the folded-out position S further towards an overfold position in which the mirror support is lodged in substantially forward orientation along the bodywork of the motor vehicle.

The cooperating stops 5a, 5b in the folded-out position S are under spring action in that the mirror support 4 is pressed onto the base plate 2 by means of a helical spring 6 arranged around the basic shaft 3.

The hinge actuator 1 further comprises a gearwheel 7, likewise subject to the action of the spring 6, which forms part of an electric drive 8 which is arranged on the mirror support 4. The drive 8 comprises an electric motor which at its output shaft is provided with a worm which cooperates by right-angle transmission with a worm wheel. The worm wheel in turn is provided with a shaft on which a second worm is arranged, which cooperates with the teeth along the periphery of the gearwheel 7.

The gearwheel 7 cooperates via a coupling 9 with a coupling ring 10 which is likewise arranged about the basic shaft 3 so as to be axially slidable under the action of the spring 6. The coupling 9 is designed as downwardly extending cams 9a arranged on the coupling ring 10, which cooperate with correspondingly shaped recesses 9b in the top surface of the gearwheel 7.

The coupling ring 10 is further arranged about the basic shaft 3 so as to be rotatable with limited travel. The coupling ring 10 may be pivotable through an angle of preferably about 20° between a first angle $\alpha 1$ corresponding to the folded-out position S and a second angle $\alpha 2$. In this exemplary embodiment, to that end, the coupling ring 10 may be provided with inwardly extending cams which are received in axially extending slots 12 recessed in the circumferential surface of the basic shaft 3. The cams can perform a free rotational stroke in the slots. Through cooperation of the sides of the inwardly extending cams 11 with the end faces of the slots 12, the free rotation of the coupling ring 10 about the basic shaft 3 is limited to about 20°.

The hinge actuator 1 further comprises a check spring 21 with which the helical spring 6 can be supported on an upper part of the mirror support 4, and a friction plate 22 which, with respect to the basic shaft 3, is axially slidable but restrained from rotation, with which the other end of the helical spring 6 is supported on the coupling ring 10.

The coupling elements 9a, 9b form a coupling 9 with which in a first position, through cooperation of the cams 9a and the recesses 9b, the basic shaft 3 is connected with the mirror support 4 via the electric drive 8. Under the influence of an external operating force, for instance upon manual operation, the cams 9a can be pulled, against the action of the spring 6, out of the recesses 9b, so that the coupling can be brought in a second position in which basic shaft 3 and mirror support 4 are not connected via the drive. In the case of such a non-driven operation, the tops of the cams 9a move over the upper surface of the gearwheel 7, and the gearwheel 7 can rotate freely relative to the basic shaft 3.

Figure 2:
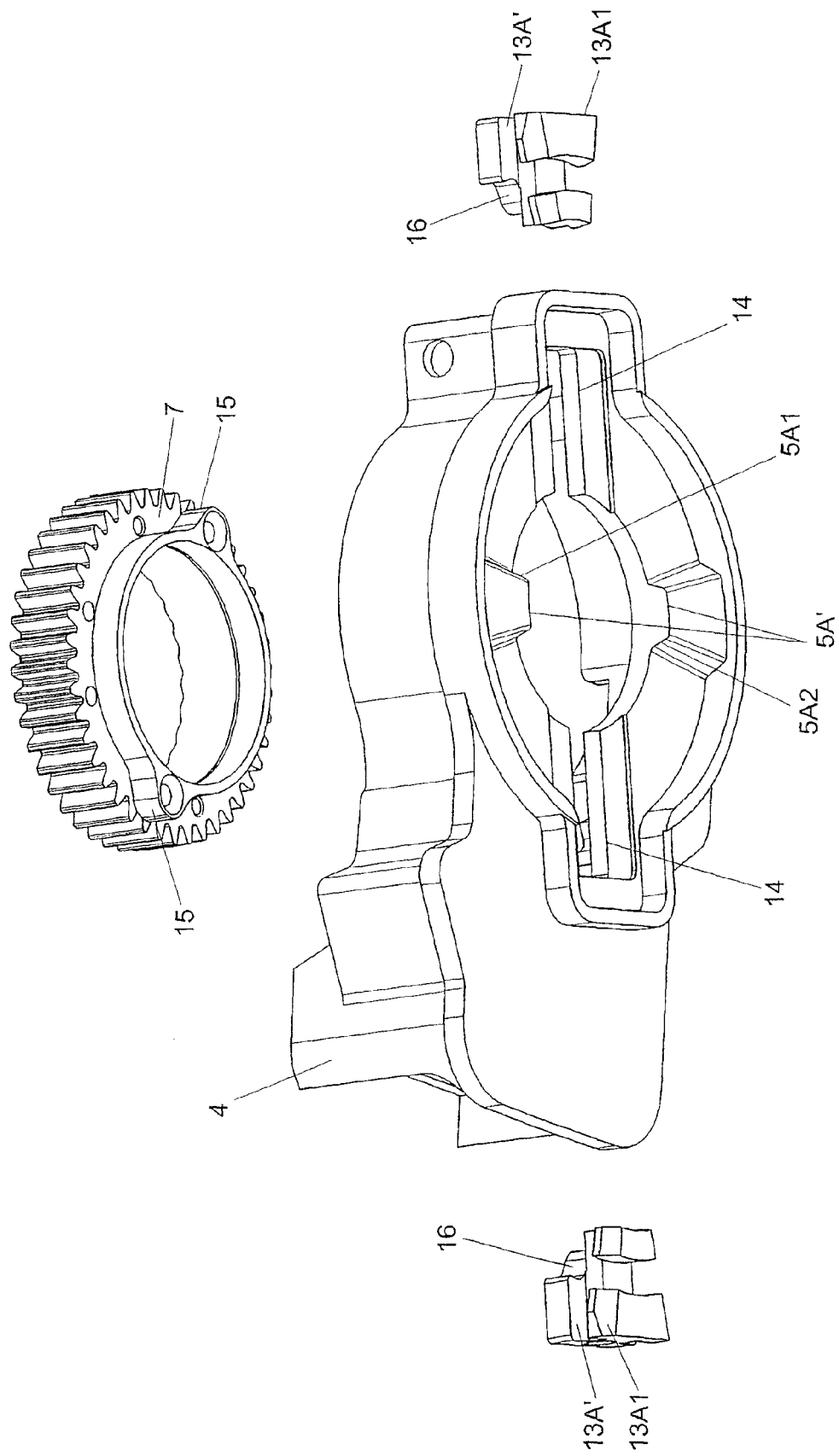
FIG. 2 is a schematic perspective view of a detail of FIG. 1, viewed from below.

As represented in FIG. 2, the hinge actuator 1 furthermore comprises two auxiliary stops 13a, 13b for defining the select or predetermined position S in a second, opposing or opposite pivoting direction. The auxiliary stops 13a are designed as stop surfaces 13a1, 13a2, provided on the mirror support 4, of cams 13a' arranged on the mirror support 4, which stop surfaces cooperate with corresponding stop surfaces 13b1, 13b2 of cam 5b' on the base plate 2.

By means of the drive 8, the auxiliary stops 13a, 13b are adjustable relative to each other from a first position represented in the left-hand part of FIG. 4, in which they block driven pivoting movement of the mirror support 4 in the inward folding direction, to a second position represented in the right-hand part of FIG. 4, in which they clear driven pivoting movement of the mirror support 4 relative to the basic shaft 3. This is implemented by accommodating the cams 13a' slidably in slots 14 which are provided in the mirror support 4. In the exemplary embodiment, the cooperating auxiliary stops 13a, 13b are each made of double design, leaving an intermediate space clear. Through displacement of the cams 13a', the stop surfaces can be aligned so as to cooperate (first position) or to correspond with the free intermediate spaces (second position).

Figure 3:
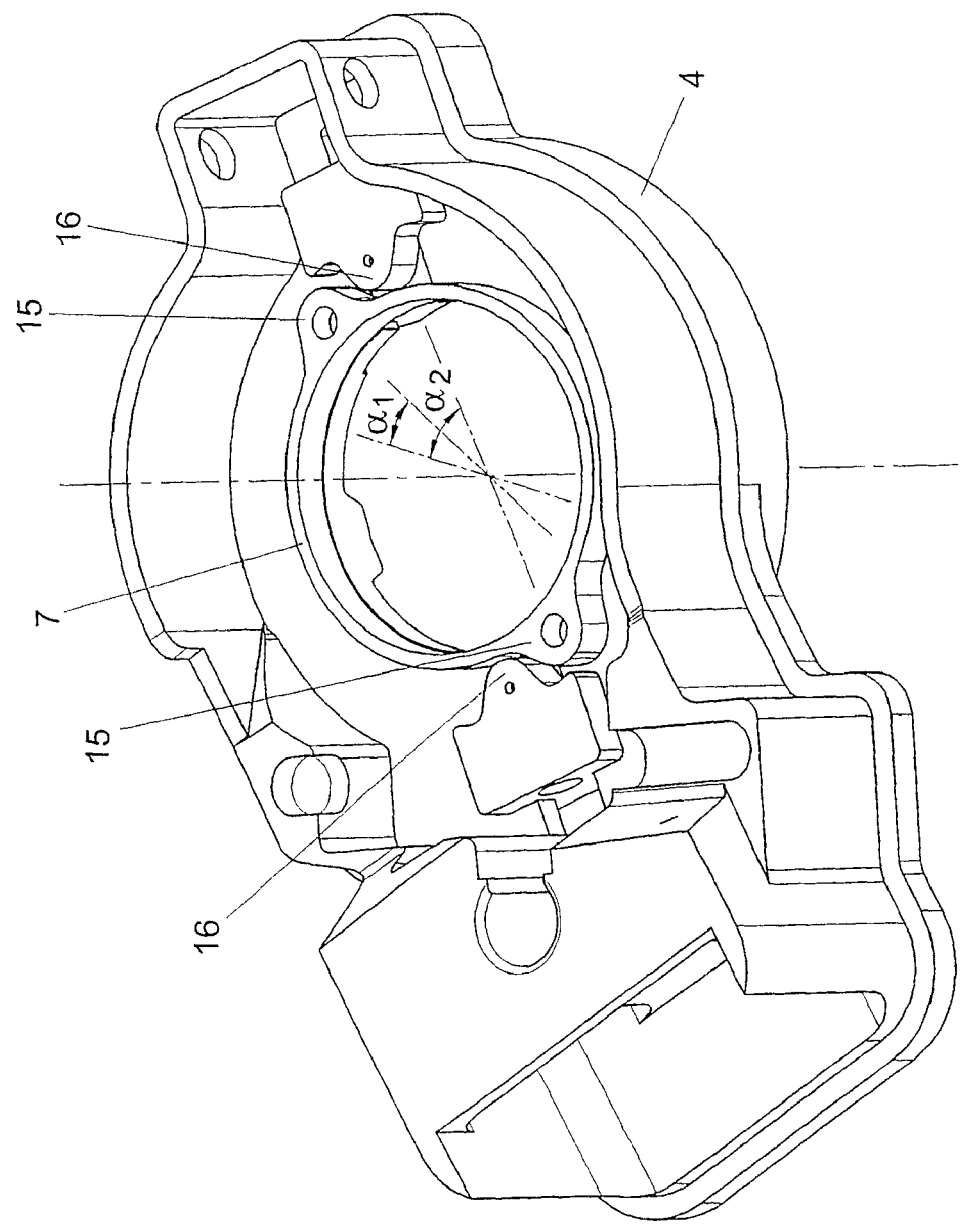
FIG. 3 is a schematic perspective view of the detail of FIG. 2, viewed from above and in assembled condition.

In FIG. 3 it is visualized that the gearwheel 7 carries two operating cams 15 for displacing the auxiliary stop cams 13a' through cooperation with corresponding operating cams 16. As a result, the auxiliary stops 13a, 13b can be adjusted relative to each other from the first position represented in FIG. 3 to the second position and vice versa. It is noted that the operating cams 15 carried by the gearwheel 7 are preferably integral with it. This is represented in FIG. 2. Of course, it is also possible to build up the gearwheel 7, as represented in FIG. 1, from separate parts.

The auxiliary stop cams 13a', and hence the auxiliary stops 13a1, 13a2, are each received in guide slots 14 under radially inwardly directed spring action by means of a spring 23.

It will be clear that use can also be made of a spring whose action is directed radially outwardly. The operating cams will then work in the opposing or opposite direction.

In the folded-out position S, the cams 5b' on the base plate 2 are situated just between the cams 5a' and the cams 13a' of the mirror support 4. Pivoting in the first direction, that is, in the outward folding direction, is hindered through cooperation of the stop surfaces 5a1, 5a2 with the stop surfaces 5b1, 5b2. Pivoting in the opposing or opposite direction, that is, in the inward folding direction from the folded-out position S, is counteracted through cooperation of the auxiliary stop surfaces 13a1, 13a2 with the auxiliary stop surfaces 13b1, 13b2.

Upon electric inward folding from the folded-out position, the gearwheel 7, under the influence of the drive 8, will cause the coupling ring 10 to pivot from the angular position α1, corresponding to the folded-out position S, to the angular position α2, corresponding to the end of the stroke of free travel. During this movement, the operating cams 15 which are carried by the gearwheel 7 will cooperate with the operating cams 16 on the auxiliary stop cams 13a'. As a result, the auxiliary stop cams 13a' will be moved radially outwards in their guide slots 12, against the action of the springs. As a result, the auxiliary stops 13a, 13b come to lie free relative to each other in a rotation path, thereby enabling the mirror support to be pivoted relative to the basic shaft in the inward folding direction under the influence of the drive.

Upon pivoting outwards to the folded-out position S by means of the drive 8, the auxiliary stop cams 13a' will be brought into the first position again, after the cooperating stops 5a, 5b hinder further pivoting of the mirror support 4 relative to the basic shaft 3.

The drive 8 will, as soon as the stops 5a, 5b cooperate, cause the gearwheel 7 via the coupling ring 10 to pivot back from the second angular position α2 to the first angular position α1.

Upon manual pivoting of the mirror support 4 relative to the basic shaft 3, the coupling 9 between the gearwheel 7 and the coupling ring 10 will be broken, so that the gearwheel 7 can rotate freely about the basic shaft 3 and the drive will not be damaged. Upon manual operation, the gearwheel 7 will stand still relative to the mirror support 4, and the operating cams 15 of the gearwheel 7 will not operate the operating cams 16 of the auxiliary stop cams 13a'. Upon manual operation, the auxiliary stops will therefore remain in the first position, so that the auxiliary stops 13a, 13b need to be overcome against the action of the helical spring 6. As a consequence, upon manual adjustment, a clearly sensible "click" can be felt when reaching or leaving the folded-out position.

It will be clear that the invention is not limited to the exemplary embodiment represented here, but that many variants are possible. In particular, it is noted that the invention is not limited in any way to line hinges, but can also be advantageously used with other kinds of hinges. Furthermore, it is noted that the construction and the build-up of the hinge can be varied, and that specifically variants are conceivable whereby the auxiliary stops can for instance move between the first and second position relative to each other along curved paths or, for instance, along paths parallel to a hinge axis of the hinge.

Also, it will be clear to the skilled person that adjusting the auxiliary stops relative to each other between the first and the second position can also be realized in other ways, for instance by arranging the gearwheel to be without free travel and restrained from rotation relative to the basic shaft and arranging the coupling ring to be pivotable through a limited angle relative to the gearwheel.

Also, the type of drive can be made of a different design than a worm/worm wheel transmission. Also conceivable is, for instance, a planetary gear transmission, a harmonic drive or a gear train.

Such variants are understood to fall within the scope of the invention as embodied by the appended claims.

What is claimed:

1. A hinge actuator, comprising:
   a first part which is pivotably connected with a second part; and
   an electric drive for pivoting the parts relative to each other;
   wherein the first and second parts form hinge parts and are provided with stops cooperating in a first pivoting direction for defining a select or predetermined position of the first and second parts relative to each other; wherein a coupling is provided between the first and the second parts, so that in a first position of the coupling the first part and second part are connected via the electric drive and, driven by the drive, can be pivoted relative to each other, and a second position in which the first and the second part are not connected via the electric drive and can be pivoted relative to each other manually; and wherein the first and second part are provided with auxiliary stops for defining the select or predetermined position in a second, opposing pivoting direction, the auxiliary stops being adjustable relative to each other by means of the drive from a first position in which they block driven pivoting movement of the hinge parts in the second direction, to a second position in which they clear driven pivoting movement of the hinge parts in the second direction.

2. The hinge actuator according to claim 1, wherein at least one of the auxiliary stops is slidably or pivotably arranged on the hinge parts.

3. The hinge actuator according to claim 2, wherein the drive is provided with a driving element that carries an operating cam for adjusting at least one of the auxiliary stops between the first and second positions.

4. The hinge actuator according to claim 3, wherein the auxiliary stops, between the first and second position, are under spring action.

5. The hinge actuator according to claim 1, wherein the drive is provided with a guide track for constrained guiding of at least one of the auxiliary stops between the first and second position.

6. The hinge actuator according to claim 1, wherein the drive is arranged, upon driven pivoting movement from the select or predetermined position in the second direction, first to adjust the auxiliary stops from the first position to the second position.

7. A hinge actuator, comprising:
   a first part comprising a base plate and basic shaft, the first part being pivotably connected with a second part comprising a mirror support, the first and second parts including cooperating stops that cooperate in a first pivoting direction for defining a select or predetermined position relative to each other, the first and second parts further including auxiliary stops for defining a select or predetermined position in a second, opposing pivoting direction;
   an electric drive for pivoting the parts relative to each other; and
   a coupling provided between the first and second parts such that in a first position the first and second parts are connected via the electric drive and can be pivoted by the drive relative to each other and in a second position the first and second parts are not connected via the electric drive and can be pivoted relative to each other manually;
   wherein the auxiliary stops are adjustable relative to each other by the electric drive from a first position in which the auxiliary stops block driven pivoting movement of the hinge parts in the second direction, to a second position in which the auxiliary stops clear driven pivoting movement of the first and second parts in the second direction.

8. The hinge actuator according to claim 7, including a first spring, the first spring being arranged around the basic shaft.

9. The hinge actuator according to claim 8, wherein the first spring is a helical spring.

10. The hinge actuator according to claim 8, including a check spring with which the first spring can be supported on a portion of the mirror support.

11. The hinge actuator according to claim 7, including a gearwheel connected to the electric drive.

12. The hinge actuator according to claim 11, wherein the gearwheel includes a plurality of peripheral teeth and the electric drive includes an output shaft with a worm, the worm cooperating with a worm wheel, the worm wheel in cooperative connection with the teeth of the gearwheel.

13. The hinge actuator according to claim 11, wherein the coupling includes a coupling ring and, upon manual pivoting of the mirror support relative to the basic shaft, the coupling between the gearwheel and the coupling ring will be broken, so that the gearwheel can rotate freely about the basic shaft 14. The hinge actuator according to claim 7, wherein the coupling includes a coupling ring and extending cams, the base shaft includes a surface with guide slots, and the extending cams are received in the guide slots.

15. The hinge actuator according to claim 14, wherein the extending cams are inwardly extending.

16. The hinge actuator according to claim 14, wherein the guide slots extend in an axial direction.

17. The hinge actuator according to claim 14, including a further spring, wherein the auxiliary stops are received in the guide slots under a radially-inwardly directed spring action provided by the further spring.

18. The hinge actuator according to claim 7, wherein the second part includes a mirror cap that surrounds a mirror supporting plate coupled with the mirror support.

19. The hinge actuator according to claim 7, wherein the drive includes a means for adjusting at least one of the auxiliary stops between the first and second positions.

20. The hinge actuator according to claim 7, wherein the drive includes a guide track for constrained guiding of at least one of the auxiliary stops between the first and second position.

* * * * *

UNITED STATES PATENT AND TRADEMARK OFFICE
CERTIFICATE OF CORRECTION

| | |
|---|---|
| PATENT NO. | : 7,543,949 B2 |
| APPLICATION NO. | : 11/551737 |
| DATED | : June 9, 2009 |
| INVENTOR(S) | : Albertus van den Brink, Milan Duchenne and Peter Alexander Hamming |

It is certified that error appears in the above-identified patent and that said Letters Patent is hereby corrected as shown below:

Title Page — item 73 should read: MCi (Mirror Controls International) Netherlands B.V., Montfoort (NL)

Signed and Sealed this

Fourteenth Day of July, 2009

JOHN DOLL
*Acting Director of the United States Patent and Trademark Office*